March 26, 1963   A. J. REED   3,082,613
BALL JOINTS AND BALL JOINTED UNIVERSAL COUPLINGS
Filed Jan. 30, 1961   2 Sheets-Sheet 1
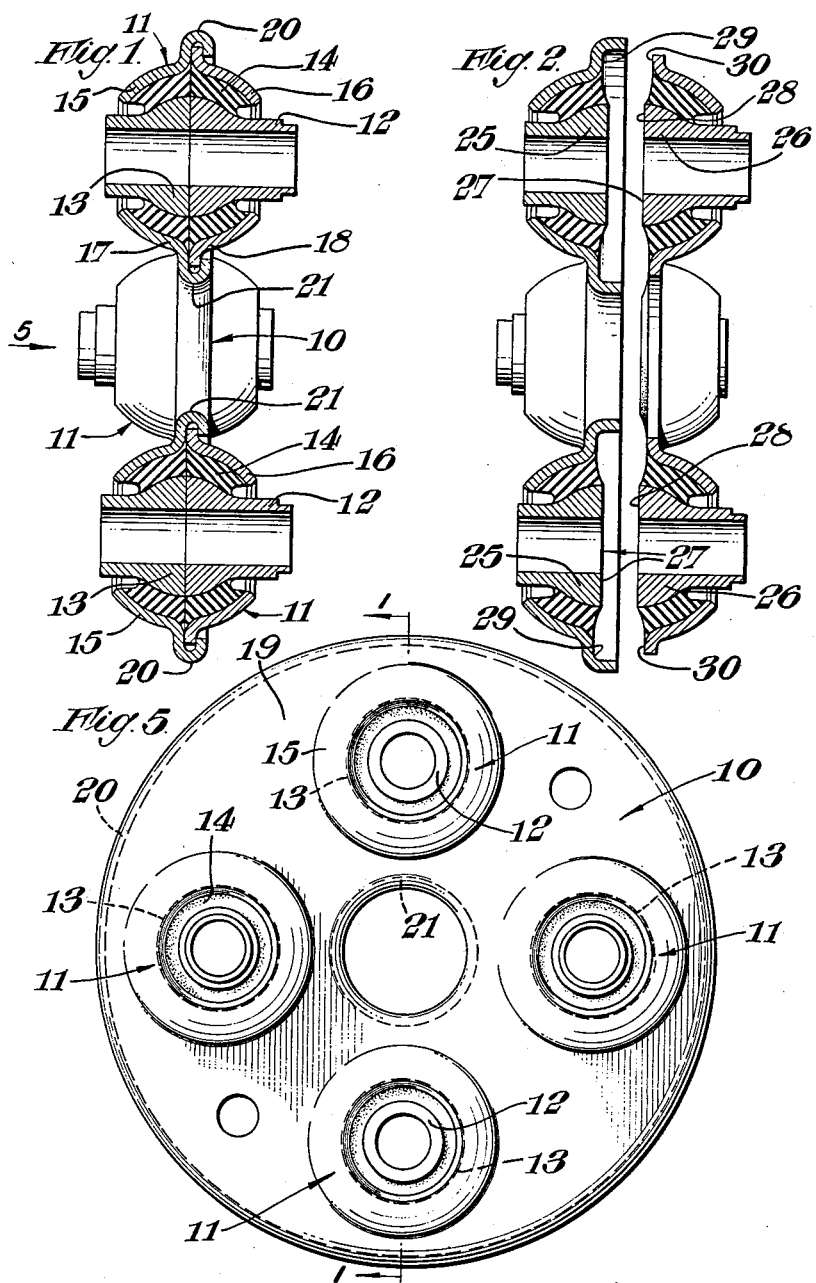

March 26, 1963 A. J. REED 3,082,613
BALL JOINTS AND BALL JOINTED UNIVERSAL COUPLINGS
Filed Jan. 30, 1961 2 Sheets-Sheet 2
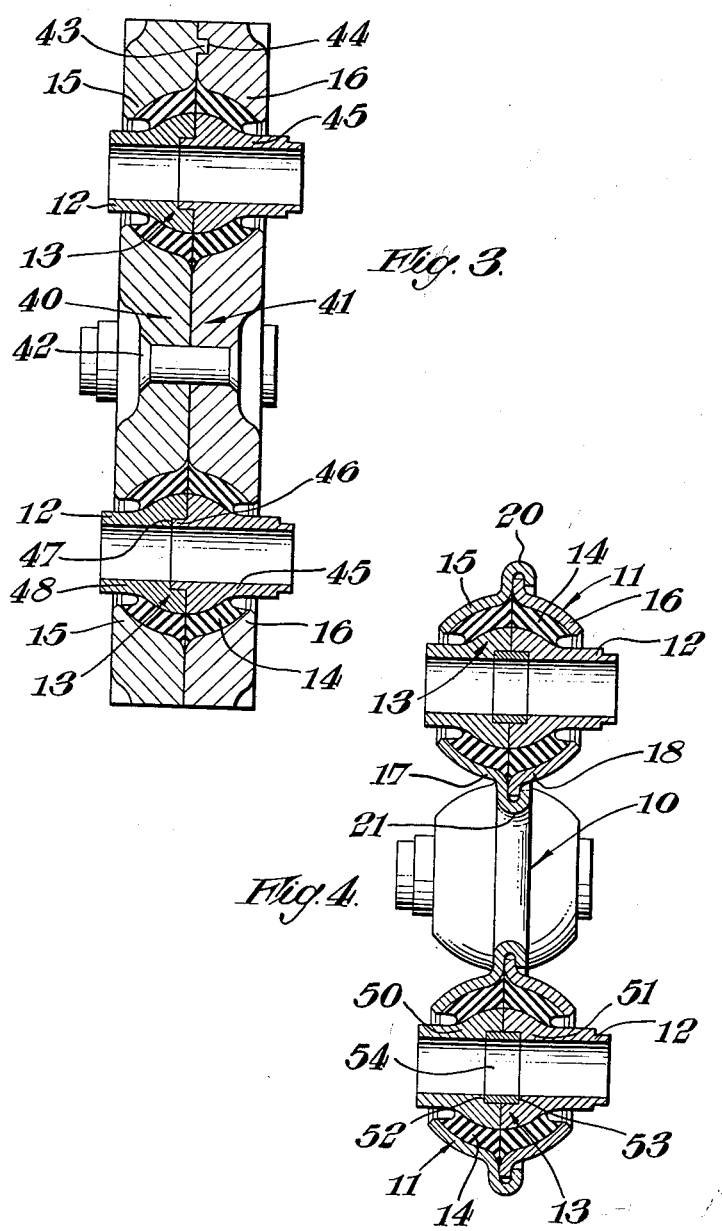

United States Patent Office 3,082,613
Patented Mar. 26, 1963

3,082,613
BALL JOINTS AND BALL JOINTED UNIVERSAL COUPLINGS
Alun John Reed, Leicestershire, England, assignor to Metalastik Limited, Leicestershire, England, a British company
Filed Jan. 30, 1961, Ser. No. 85,610
Claims priority, application Great Britain Apr. 11, 1960
6 Claims. (Cl. 64—11)

This invention relates to universal couplings of the kind, hereinafter referred to as of the kind described, comprising a disc member, and two sets of ball joints, one set for connecting a driving member of a transmission with the disc member and the other set for connecting the disc member with a driven member of the transmission, the ball joints being of the kind comprising an inner ball element, and two cup-like portions which envelope the ball element and which compress a layer of rubber or the like resilient material, between the ball element and the cup-like portions, and the disc member being made up of two plate members united face to face, the cup-like portions of each ball joint being formed one in one of the plate members and the other in the other of the plate members.

It is known that universal couplings of the kind described have a large torque capacity compared with other types of universal coupling of equivalent size. It has been found however, that if subjected to excess torque especially under conditions of more acute angular misalignment than normally contemplated, the rubber layers of the ball-joints tend, if not bonded to the cup-like portions, to slip round in the housings formed by the cup-like portions so that the rubber becomes displaced and the inner ball-like parts forced off centre in the housings. This gives rise to undesirable out-of-balance forces during rotation of the coupling.

The object of the present invention is to provide a construction of disc coupling of the general kind described above which may be manufactured using a moulding technique for producing the rubber layers of the ball joints and in which the rubber layers are in pre-compression between the inner ball elements and the cup-like portions of each ball joint and are bonded both to the inner ball elements and the cup-like portions thereby to prevent displacement of the rubber layers in the housings formed by the cup-like portions.

Thus in carrying out the invention the ball element of each ball joint of the coupling is formed in two parts, each of which is then moulded into one of the cup-like portions of the outer housing of the joint with a surrounding interlayer of rubber so that the rubber becomes bonded to the cup-like portion and to the ball element part. The two plate members are then assembled face to face and secured together with the pairs of cup-like portions in their required relation, the parts of the ball elements having been so positioned during the moulding operation that ball element parts are first brought together in their required relation with respect to one another and then displaced each relative to the cup-like portion into which it has been moulded, to its required position in the cup-like portion, this displacement giving rise to compression in the rubber interlayers between the cup-like portions and said parts as required.

Preferably, the two parts of the ball element of each ball joint are joined together at join faces disposed parallel to the joint plane between the plate members making up the disc member.

The two parts of the ball element of each ball joint preferably also have aligning central bores for a bolt or the like which may serve for securing the two parts together. Prior to the fitting of this bolt however the two parts may be held "joined" together by the compression in the rubber layer of the ball joint. Alternatively the two parts may be adhesively united or projection welded together.

The two parts of the ball element of each ball joint may be in two halves joined together at a single pair of join faces disposed each in the joint plane between the plate members making up the disc member.

Alternatively, to hold the two parts of each ball element against tipping and transverse displacement relative to one another, one of the parts may have a spigot which is received in a corresponding recess in the other part. Again the parts may have a pair of aligning recesses which receive a dowel to hold them against tipping or transverse displacement relative to one another.

Where the two parts of each ball element have aligning bores and a single central spigot is provided, the central spigot is in the form of an upstanding annular flange surrounding the bore in the spigoted part and the recess to receive the spigot is correspondingly formed in the other part.

Where the two parts of each ball element have aligning bores, and a single central dowel is provided, the dowel is in the form of a sleeve having a bore of the same diameter as, and which aligns with, the bores in the two parts of the ball-like part.

Universal couplings according to the invention, will now be described merely by way of example with reference to the accompanying drawings whereof:

FIG. 1 is a cross-section of one coupling according to the present invention,

FIG. 2 is a cross-section corresponding with FIG. 1 illustrating a step in the manufacture of the coupling shown in FIG. 1.

FIG. 3 is a view corresponding to FIG. 2 of a further coupling according to the invention, FIG. 4 is a view corresponding to FIG. 2 of a still further coupling according to the invention, and FIG. 5 is an elevation of the coupling shown in FIG. 1.

Referring to FIGS. 1 and 5 the coupling comprises an annular disc member 10 having at four points spaced uniformly around the member on a common pitch circle four ball joints generally indicated at 11. Each ball joint comprises an inner ball element 13 formed as a part spherical protuberance on a hollow rod-like inner member 12 on to which protuberance is bonded a layer of rubber 14. The rubber layer is of uniform thickness and is externally spherical being bonded in two part spherical cup-like portions 15, 16 of the annular member 10 which envelope the protuberance 13, and compress the rubber layer 14 against the protuberance.

The annular disc member 10 is formed by two annular metal discs 18, 19, secured together face to face by swaging or spinning over the outer and inner peripheral edge parts of the disc 18 as at 20 and 21, respectively in FIG. 1.

Alternatively the discs may be bolted, riveted or spot welded together face to face or otherwise connected together in any convenient way. The cup-like portions 15, 16 of each ball joint are formed as pressings in the two metal discs respectively.

As a further alternative, the discs may be composed by a pair of die castings or plastic mouldings 40, 41 (see FIG. 3) cast or moulded with the cup-like portions 15, 16 or again they may be plastic mouldings moulded with the cup-like portions 15, 16. In either of these cases the discs may be whole (as shown in FIG. 3) and sufficiently rigid to enable them to be secured together using a single central bolt or rivet such as shown at 42 there being moulded or cast projections and recesses 43 and 44 on the two discs respectively to ensure the correct angular location of the discs relative to one another.

In order to achieve bonding between the rubber layers 14 and the cup-like portions 15, 16 and between the rubber layers 14 and the protuberances 13 it is necessary, as is well known, to mould and cure the rubber layers while they are in contact with the cup-like portions and the protuberances. However, if the rubber layers are moulded and bonded directly in the annular spaces occupied by the rubber layers 14 in the finished coupling, the rubber layers would be in tension due to the bonding whereas it is required, in the finished coupling as described, that the layers 14 be in radial precompression. This is necessary to increase the fatigue life of the rubber.

To overcome this problem, according to the present example, each rod like inner member 12 is formed in two parts 25, 26 (see FIG. 2) split normally to the axis of the rod-like member in the mid plane of the protuberance, and the parts 25 and 26 are moulded into the cup-like portions 15 and 16 respectively with a surrounding interlayer of rubber bonded to the cup-like portion and the rod-like inner member part, in the positions shown in FIG. 2.

In these positions the parts 25, 26 are displaced axially from their required position in the finished coupling so that the join faces 27, 28 of the parts which abut in the finished coupling, are raised above the join faces 29, 30 of the annular metal discs 18, 19.

Consequently, when the discs 18, 19 are assembled and secured together to form the finished coupling, the parts 25, 26 are first brought together at their join faces 27, 28 in their required relation with respect to one another, and the parts are then displaced in the cup-like portions to their required position in the cup-like portions, this displacement relieving the bonding tension and radially pre-compressing the interlayers of rubber, and the interlayers then together forming the rubber layers 14.

The parts 25, 26 have central aligning axial bores to receive the fixing bolts of the coupling, the fixing bolts serving finally to join the parts together. Alternatively the parts 25, 26 may be joined by projection welding or by sticking using a suitable adhesive.

If desired, in order properly to locate the two parts of each ball element and to prevent them tipping or moving transversely relative to one another in the case where fixing bolts are not to be used (i.e. where the aligning fixing bores are dispensed with and one of the parts has a screw threaded stud for a fixing nut), or prior to the insertion of the fixing bolts in the aligning bores, one of the parts 45 (see FIG. 3) of each ball element may have a central spigot 46, which in the example shown, is in the form of an upstanding annular flange surrounding the bore in the part 45, and which is closely fitted in a corresponding central recess 47 in the other part 48, the bore of the part 48 opening to the centre of the recess.

Alternatively each of the parts 50, 51 of each ball element may have a central recess 52, 53, a dowel 54 being closely fitted in the two recesses to prevent tipping or transverse displacement of one of the parts 50, 51 relatively to the other, as shown in FIG. 3. Where the recesses 52, 53 are centrally disposed and the parts have aligning bores as shown, the dowel is in the form of a sleeve having a bore of the same diameter as, and which aligns with, the bores in the two parts joined by the sleeve. Instead of having the dowel 54 centrally disposed, a plurality of dowels may be provided fitted in a ring of aligning recesses surrounding the bores of the two parts of the inner ball-like part. Instead of a centrally disposed spigot in the FIG. 3 construction a ring of spigots may be provided on the parts 45 filled in a ring of recesses in the parts 48.

The dowels or spigots described, together with their co-operating recesses may be used in addition to adhesively uniting or projection welding the two parts of each ball element together.

The universal coupling illustrated in FIG. 4 is made in the same way as has been described for the couplings shown in FIGS. 1, 5 and 3 and in FIG. 4 the reference numerals corresponding with those used in FIGS. 1 and 5 indicate like parts as have been described with reference to FIG. 1. This applies also to FIG. 3.

The universal coupling described has ball joints in which the rubber layers are bonded to the inner ball elements, and to both cup-like portions enveloping the ball elements, the rubber layers being held in a state of radial precompression between the ball elements and the cups.

Because the rubber layers are bonded to the cup-portions any tendency for them to slip round in the housings formed by the cup portions under high torque transmission conditions is prevented and the couplings may therefore be used under conditions in which their full torque capacity is realized without danger of out of balance occurring due to displacement of the rubber layers in the housings.

In a modification of the method as described the method is employed to obtain a partial pre-compression of the rubber layers 14, or merely to relieve the bonding tension in the rubber layers, whereafter the rod-like inner members 12 are expanded, and therefore the protuberances 13 to compress or further compress the rubber layers to obtain the required pre-compression. The rod-like inner members are conveniently expanded in this way by passing a drift through each.

I claim:

1. A universal coupling for drivably connecting a driven member with a driving member, the coupling comprising a disc member carrying two sets of ball joints for connection respectively to the driving and driven members with the disc member positioned therebetween, the disc member being made up of two plate members united face to face, each ball joint comprising an inner ball element and an outer housing, the outer housing being formed by two cup-like portions formed respectively in the two plate members, the cup-like portions together enveloping the ball element and compressing a layer of rubber material thereagainst, the ball element of each ball joint being formed in two parts joined together at faces disposed parallel to the joint plane between said plate members, the rubber material layer of each ball joint being formed in two parts one contained in each cup-like portion of the joint and bonded to the inner surface thereof and to one of the ball element parts of the joint.

2. A universal coupling as claimed in claim 1, wherein the two parts of the ball element of each ball joint have aligning central bores for a bolt which serves for securing the two parts together.

3. A universal coupling as claimed in claim 1, wherein the two parts of the ball element of each ball joint are adhesively united.

4. A universal coupling as claimed in claim 1, wherein the two parts of the ball element of each ball joint are projection welded together.

5. A universal coupling as claimed in claim 1 wherein one of the two parts of the ball element of each ball joint has a spigot which is received in a recess in the other part, the spigot and the recess co-operating to prevent relative tipping of said parts and to hold the parts against transverse displacement relative to one another.

6. A universal coupling as claimed in claim 1, wherein the two parts of the ball element of each ball joint have a pair of aligning recesses which receive a dowel which holds the parts against tipping or transverse displacement relative to one another.

References Cited in the file of this patent

UNITED STATES PATENTS

| | | |
|---|---|---|
| 2,838,436 | Clingman | June 10, 1958 |
| 2,979,353 | Sellers | Apr. 11, 1961 |

FOREIGN PATENTS

| | | |
|---|---|---|
| 493,794 | Great Britain | Oct. 14, 1938 |